F. WATKINS.
Vessels for Measuring Ice-Cream, &c.
No. 166,667.                               Patented Aug. 10, 1875.
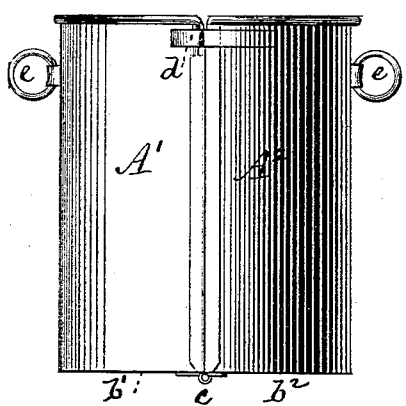
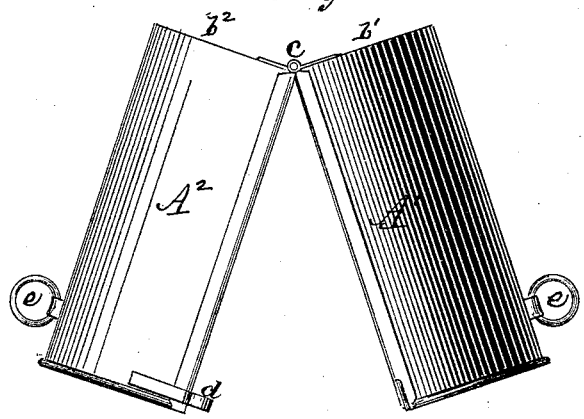
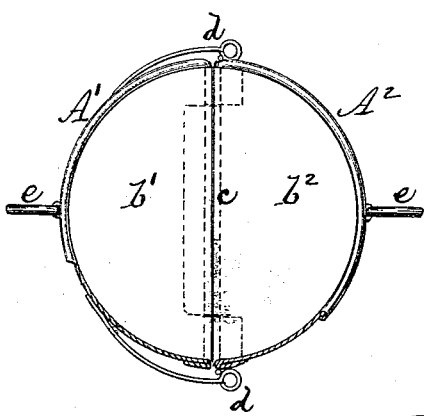

UNITED STATES PATENT OFFICE.

FRANK WATKINS, OF NEW YORK, N. Y.

IMPROVEMENT IN VESSELS FOR MEASURING ICE-CREAM, &c.

Specification forming part of Letters Patent No. 166,667, dated August 10, 1875; application filed March 25, 1875.

*To all whom it may concern:*

Be it known that I, FRANK WATKINS, of New York, in the county and State of New York, have invented an Improved Vessel for Measuring Ice-Cream and for similar purposes; and I do hereby declare that the following is a full, clear, and exact description of the same, reference being had to the accompanying drawing, which forms part of this specification.

My invention relates to a measuring device, which is more particularly intended for the use of confectioners or ice-cream dealers, for the purpose of measuring ice-cream and transferring it to the vessels brought by customers for the reception thereof.

My invention consists of a vessel divided longitudinally into two equal sections, which latter are hinged together at their bottom and provided at or near their top with fastening devices for securing them together, as will more fully hereinafter appear.

The measuring devices generally used by retail dealers for measuring ice-cream are sometimes made somewhat larger at the top than at the bottom, in order to facilitate the depositing of the cream in a solid mass when the measure is reversed; but in measures of this description there are several disadvantages, which are obviated in my invention.

In the accompanying drawing, Figure 1 is a side view of my improved measure in an upright and closed position. Fig. 2 is a side view of the measure in a reversed and open position. Fig. 3 is a top view.

The vessel is divided longitudinally to form two equal sections or halves, $A^1 A^2$, which latter are joined to each other by a closely-fitting hinge, $c$, and the edges $a$ of the sections are made to correspond with each other, so that when in a closed position the joints are tight enough to give the vessel all the advantages, for the purpose for which it is designed, of an ordinary measuring-vessel. The two sections are held together, when closed, by spring catches $d\ d$, on one section engaging with ribs, beads, or other projections on the other section. The springs $d$ are just stiff enough to hold the sections in place together when no outward pressure is brought to bear upon them, but allow them to swing open when pulled outward. The sections are provided with lugs or rings $e$, or handles of any suitable construction.

The cream is measured in the vessel in the same manner as in an ordinary measuring-vessel, and when the vessel is to be emptied it is turned upside down in the dish placed for its reception, and the sections are opened to the position shown in Fig. 2 by pulling them outward by means of the handles $e$, by which means the cream is deposited in a solid mass without disturbing the shape acquired in the measure.

Measures constructed according to my invention may be made of different sizes and of any suitable material, and the form may be varied to suit the fancy, without affecting the nature of the invention.

What I claim as new, and desire to secure by Letters Patent, is—

As an article of manufacture, a vessel for measuring ice-cream, longitudinally divided into two equal sections, $A^1 A^2$, hinged together at their bottom and provided with fastening devices at their top for securing the sections together, the whole being combined substantially as and for the purpose described.

F. WATKINS.

Witnesses:
 BENJAMIN W. HOFFMAN,
 FRED. HAYNES.